United States Patent [19]

Kamat

[11] Patent Number: 4,495,661
[45] Date of Patent: Jan. 29, 1985

[54] COMPOSITE INTERLINING MATERIAL

[75] Inventor: Dattatraya V. Kamat, Yardley, Pa.

[73] Assignee: Crown Textile Company, Jenkintown, Pa.

[21] Appl. No.: 479,441

[22] Filed: Mar. 28, 1983

[51] Int. Cl.³ .............................................. A41D 27/02
[52] U.S. Cl. ................................................ 2/97; 2/272;
2/243 R; 428/198; 428/246; 428/287; 428/316.6
[58] Field of Search .................... 156/178; 428/316.6, 428/198, 246, 286, 287; 2/97, 243 R, 243 A, 243 B, 255, 272, 274

[56] References Cited

U.S. PATENT DOCUMENTS

| 3,098,235 | 7/1963 | Gusman | 428/198 |
|---|---|---|---|
| 3,251,727 | 5/1966 | Reynolds et al. | 428/198 |
| 3,355,535 | 11/1967 | Hain et al. | 428/316.6 |
| 3,574,105 | 4/1971 | Sachs | 428/316.6 |
| 3,666,595 | 5/1972 | Bauer | 156/178 |

*Primary Examiner*—William J. Van Balen
*Attorney, Agent, or Firm*—Bell, Seltzer, Park & Gibson

[57] ABSTRACT

The composite chest piece interlining material is formed of first and second outside layers of fabric with a sheet of foam material sandwiched therebetween. Discontinuous adhesive coating is applied to the inner surfaces of the outside layers of fabric and adhesively connects the same to the opposite surfaces of the middle layer of foam material. The foam material provides bulk and resiliency to the interlining material while the first and second outside layers of fabric provide smooth and nonabrasive surfaces to the interlining material and also restrict the normal tendency of the foam material to stretch and tear.

5 Claims, 3 Drawing Figures

COMPOSITE INTERLINING MATERIAL

FIELD OF THE INVENTION

This invention relates generally to a lightweight composite interlining material having sufficient bulk to be used as a chest piece for a suit front or the like and wherein outside layers of fabric are adhesively secured to opposite sides of a middle layer of foam material.

BACKGROUND OF THE INVENTION

It is the usual practice to provide some type of interlining material on the inner surface of the front panels of a suit in order to improve the durability and appearance of the suit. Substantially the entire inner surface of the front panel is normally provided with a base canvas or hairpiece, usually formed of knitted or woven fabric, and secured to the inner surface of the front panel by fusion bonding of the fabric thereto. Additionally, the upper or breast portion of the suit front panel is provided with one or more separate layers of interlining material, normally referred to as a chest piece.

In some instances, the interlining chest piece is formed of an inner layer of woven material weighing approximately five to six ounces per square yard, and a separate outer layer of nonwoven fibers weighing approximately two to three ounces per square yard. In other instances, the chest piece is formed of two separate layers of nonwoven fibers with one layer weighing approximately five to six ounces per square yard and the other weighing approximately four ounces per square yard. With either of these chest pieces, it may be desirable to provide an additional wedge of woven material weighing approximately four to five ounces per square yard in the area of the upper extremity of the suit panel in order to provide additonal stiffness and weight or padding to the shoulder area of the front panel.

When chest pieces of this type are formed of two or more separate layers of material, each separate layer of material must be cut to the required shape in a separate cutting operation and the individual layers must be properly positioned relative to each other and to the suit front. This separate cutting and positioning of the layers of material requires skilled workers and adds to the cost of the garment. Also, the individual layers of the chest piece can become wrinkled relative to each other so that they produce an unsightly appearance on the suit front panel. In some instances, moisture may collect in the individual layers during dry cleaning of the garment and may cause a "bubble" appearance on the outer surface of the garment.

In an attempt to overcome the problems inherent with the use of a multilayer chest piece, U.S. Pat. No. 3,098,235 suggests the use of a single-layer chest piece formed of nonwoven fibers. However, this single-layer chest piece of nonwoven fibers is of substantially the same weight as the prior multilayer chest piece, approximately seven to ten ounces per square yard. A single-layer chest piece of nonwoven fibers of this weight is too bulky and thick to provide the proper amount of drape and resiliency to the suit front panel.

SUMMARY OF THE INVENTION

With the foregoing in mind, it is an object of the present invention to provide a composite chest piece interlining material and method of forming the same which includes outer fabric layers with a middle layer of foam material sandwiched therebetween and being adhesively connected to the outer layers of fabric so that a single-piece chest piece of the required shape can be readily cut therefrom. The foam material provides bulk and resiliency while the layers of fabric provide smooth and nonabrasive surfaces and strengthen the foam material. The present chest piece interlining material provides the desired amount of bulk, without the weight associated with prior types of chest piece interlining material. The present composite chest piece interlining material has good wrinkle resistance, resiliency, is easily moldable, and has good durability for long wear, as well as good appearance and dry cleaning resistance.

It is preferred that the bulky and lightweight composite interlining material of the present invention be formed with first and second outside layers of nonwoven fibers with a middle layer formed of a sheet of polyurethane foam sandwiched between the first and second outside layers. A discontinuous coating of randomly arranged dots of adhesive material is thermally activated and adhesively connects the adjacent surfaces of the first and second outside layers of fabric to the opposed surfaces of the middle layer of polyurethane foam. The bulk and light-weight characteristics provided by the foam material permit the composite interlining material to have an overall weight of approximately three to four ounces per square yard. The formation of the chest piece of adhesively secured together layers of fabric and foam material permits a wide variation of characteristics to be imparted to the interlining material by varying the characteristics of the outer layers of fabric and/or the characteristics of the foam material to thereby control the durability, stability, stiffness, shape retention, wrinkle resistance, spring back, and tensile strength of the interlining fabric.

BRIEF DESCRIPTION OF THE DRAWINGS

Other objects and advantages will appear as the description proceeds when taken in connection with the accompanying drawings in which.

DESCRIPTION OF THE ILLUSTRATED EMBODIMENT

Figure 1:
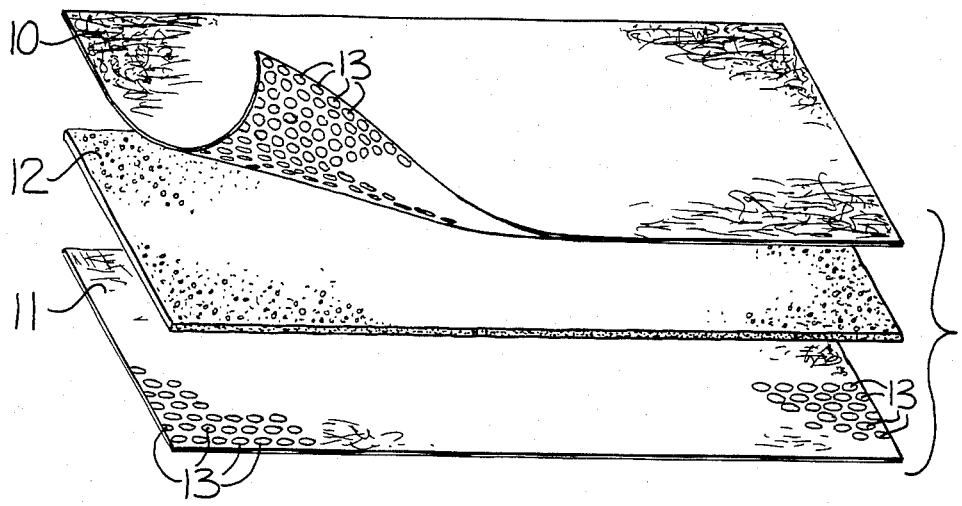
FIG. 1 is an exploded, isometric view of the composite chest piece interlining material and illustrating the relationship of the outer fabric layers relative to the middle layer of sheet foam material before they are adhesively secured together.
Figure 2:
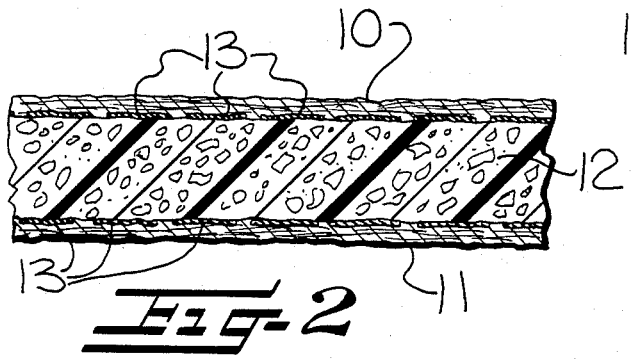
FIG. 2 is a greatly enlarged vertical sectional view through the present composite chest piece interlining material.

As illustrated in FIG. 1, the bulky and light-weight composite chest piece interlining material includes a first or upper outside layer of fabric 10, a second or lower layer of fabric 11, and a middle layer of sheet foam material 12 which is sandwiched between the first and second outside layers 10, 11. A discontinuous coating means, in the form of randomly arranged dots 13 of thermally active material, is applied to the inner surfaces of the first and second layers of fabric 10, 11 and adhesively connects the adjacent surfaces of the outside layers of fabric to the opposed surfaces of the middle layer of sheet foam material 12. It is preferred that the first and second outside layers 10, 11 be formed of a batt of polyester, nonwoven fibers with binder and that the middle layer 12 be formed of a sheet of polyurethane foam. The composite chest piece interlining material is of a relatively light-weight construction and should weigh no more than approximately three to four ounces per square yard. In certain instances, it may be desirable to provide a heavier chest piece, weighing as much as seven ounces per square yard.

As a specific, but nonlimiting example, it has been found that a satisfactory composite chest piece interlining material can be formed with the first and second outside layers 10, 11 each being formed of polyester nonwoven fibers weighing approximately 1.3 ounces per square yard while the sheet of polyurethane foam 12 is 55 mils thick and weighs approximately one ounce per square yard. Thus, the overall weight of this composite chest piece interlining material is 3.6 ounces per square yard and the foam material 12 provides bulk and resiliency while the first and second outside layers 10, 11 restrict the normal tendency of the foam material 12 to stretch and tear and provide good durability. Also, the outer surfaces of the sheet of polyurethane foam 12 are normally rough and abrasive and the outside layers 10, 11 of nonwoven fibers provide smooth and nonabrasive upper and lower surfaces to the interlining material.

The bulky and lightweight composite chest piece interlining material of the present invention is formed by applying a discontinuous coating of adhesive material which is thermally activatable, in the form of randomly arranged dots 13 of thermally adhesive material, to the inner surfaces of the first and second outside layers 10, 11. The sheet of foam material 12 is then sandwiched between the first and second outside layers 10, 11 with the randomly arranged dots of thermally adhesive material 13 adjacent opposite sides of the foam material. Heat and pressure are then applied to the upper and lower surfaces of the sandwiched or composite interlining material so that the randomly arranged dots 13 are thermally activated and the outside layers 10, 11 are adhered to the outside surfaces of the sheet of foam material 12. The composite chest piece interlining material of the present invention is sold to the garment manufacturer in sheet or roll form and individual chest pieces of the proper shape can then be cut therefrom.

While it is preferred that the outside layers of fabric 10, 11 comprise nonwoven batts of fibers, it is to be understood that other types of woven or knit fabric can be used. The layers of fabric 10, 11 should be within the range of approximately one to one and one-half ounces per square yard. Also, the sheet of foam material 12 should be within the range of approximately 30 to 100 mils thick and should weigh approximately one to four ounces per square yard.

Figure 3:
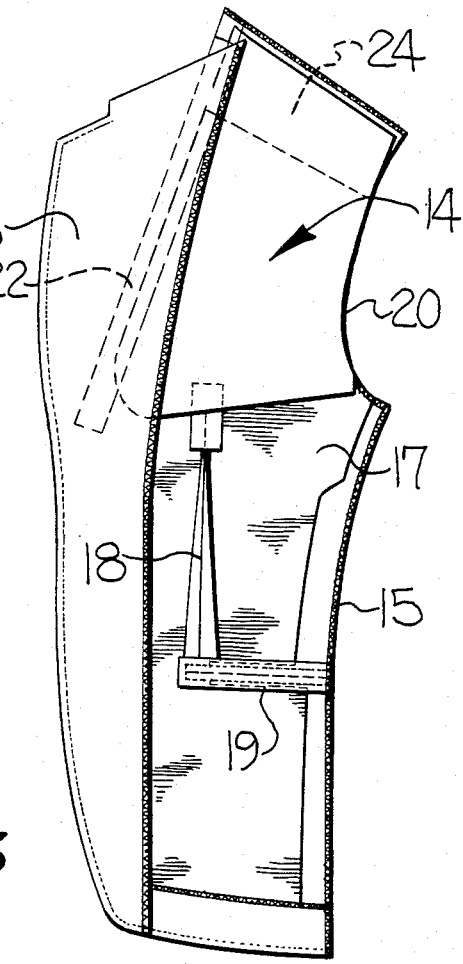
FIG. 3 is an elevational view of the inside of a typical suit front panel and illustrating the manner in which the composite chest piece interlining of the present invention is applied thereto.

The cut chest piece, broadly indicated at 14 in FIG. 3, is illustrated in the position it normally occupies on the inner surface of a typical suit front panel 15. A lapel panel 16 is stitched along one side of the front panel 15 and a base canvas or hairpiece, in the form of knit interlining material 17, is fusibly attached to and covers substantially the entire inner surface of the front panel 15. Any suitable type of darts 18, 19 may be provided in the front panel 15. The upper side of the front panel 15 is provided with an arcuate cut edge 20 for receiving the sleeve of the garment and the chest piece interlining 14 is cut along one side to correspond with the curved cut 20 in the front panel 15.

The other side of the chest piece interlining material 14 is cut to underlie the edge portion of the lapel panel 16 and is illustrated as being secured in position on the interlining 17 by a nonwoven strip of thermally fusible material 22. The other side of the chest piece interlining material 14 may be secured to the front panel 15 and the interlining material 17 by suitable stitching or by the use of a strip of fusible nonwoven material. If desired, an additional wedge of interlining material, indicated at 24, can be positioned adjacent the upper end of the composite chest piece interlining material 14. This wedge 24 may be cut from knit or woven fabric and may be positioned on the inside of the chest piece 14, as shown in FIG. 3, or it may be positioned on the outside of the chest piece 14. When the wedge 24 is formed of woven fabric, it is usually cut on the bias. The wedge 24 is employed when it is desired to add bulk and additional body to the shoulder area of the suit front panel 15.

Thus, the composite chest piece interlining material of the present invention is cut to the proper shape and then may be easily and quickly positioned and secured in the proper position on the suit front panel 15. The chest piece interlining material has sufficient bulk without excess weight and has good resiliency, durability and wrinkle resistance.

In the drawings and specification, there has been set forth the best mode presently contemplated for the practice of the present invention, and although specific terms are employed, they are used in a generic and descriptive sense only and not for purposes of limitation, the scope of the invention being defined in the claims.

That which is claimed is:

1. A garment panel comprising a base fabric cut to the desired shape for being connected to other panels to form the garment, and a bulky and lightweight composite interlining material attached to the inner surface of said base fabric for providing bulk and durability thereto, said interlining material comprising a first outside layer of fabric, a second outside layer of fabric, at least one of said outside layers of fabric comprising a nonwoven batt of fibers, a middle layer of foam material sandwiched between said first and second outside layers, and means adhesively connecting the adjacent surfaces of said first and second outside layers of fabric to the opposed surfaces of said middle layer of foam material to form the composite interlining material, the total weight of said composite interlining material being within the range of approximately three to seven ounces per square yard, said foam material providing bulk and resiliency to said interlining material, and said first and second outside layers of fabric providing smooth and nonabrasive surfaces to said interlining material and while restricting the normal tendency of said foam material to stretch and tear.

2. A garment panel according to claim 1 wherein said first and second outside layers of fabric of said composite interlining material each comprises a nonwoven batt of fibers.

3. A garment panel according to claim 1 wherein said foam material of said composite interlining material comprises a sheet of polyurethane foam.

4. A garment panel according to claim 1 wherein said garment panel comprises a coat front panel, and wherein said composite interlining material comprises a chest piece attached to the inner surface of the upper portion of said coat front panel.

5. A garment panel according to claim 4 including a wedge of interlining fabric positioned adjacent the upper portions of said chest piece and said coat front panel to provide additional bulk and body thereto.

* * * * *